Oct. 17, 1939.　　　　　L. G. BOWEN　　　　　2,176,054
TWO-SPEED SPROCKET
Filed Aug. 12, 1935　　　　2 Sheets-Sheet 1
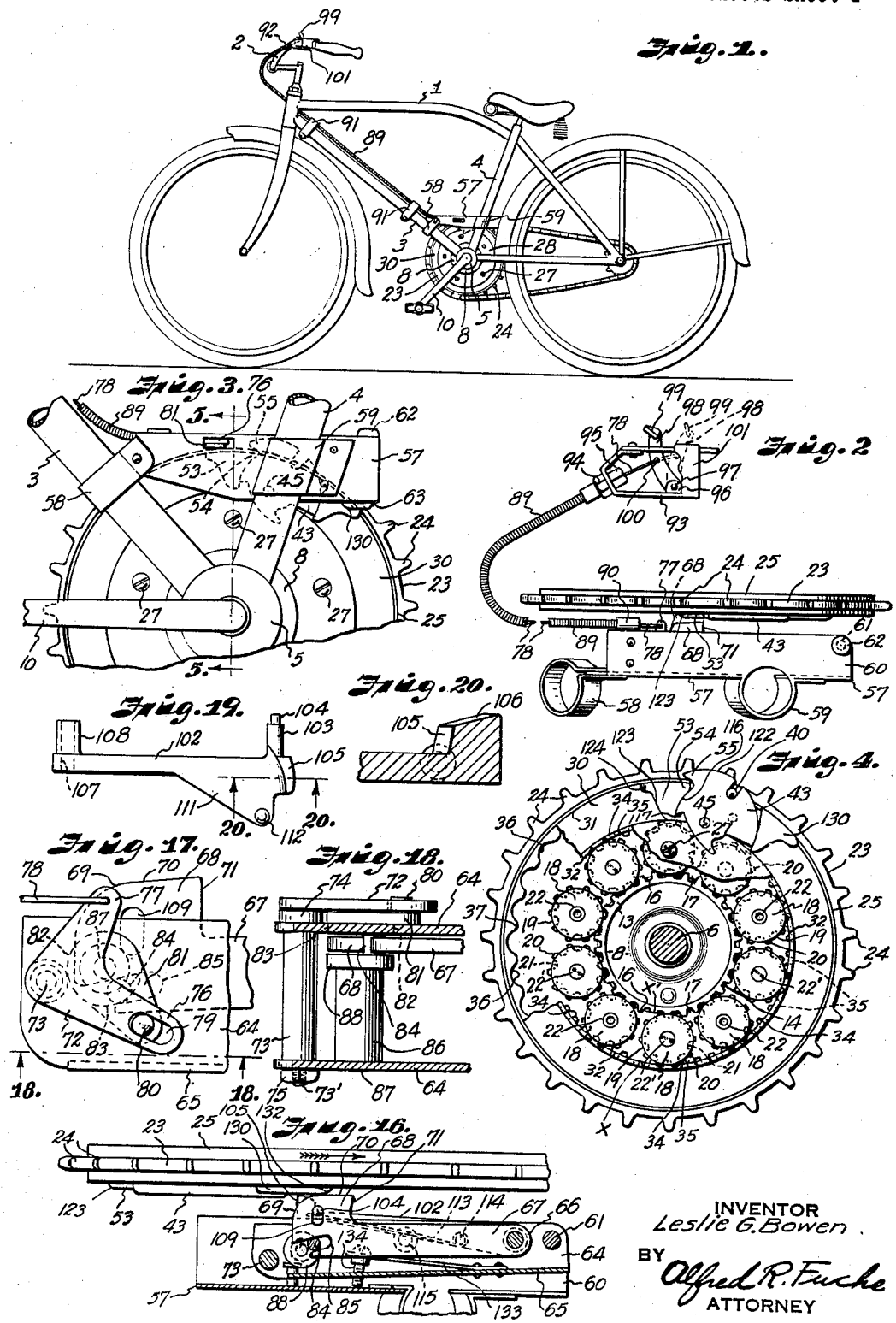
INVENTOR
Leslie G. Bowen.
BY
Alfred R. Fuchs
ATTORNEY

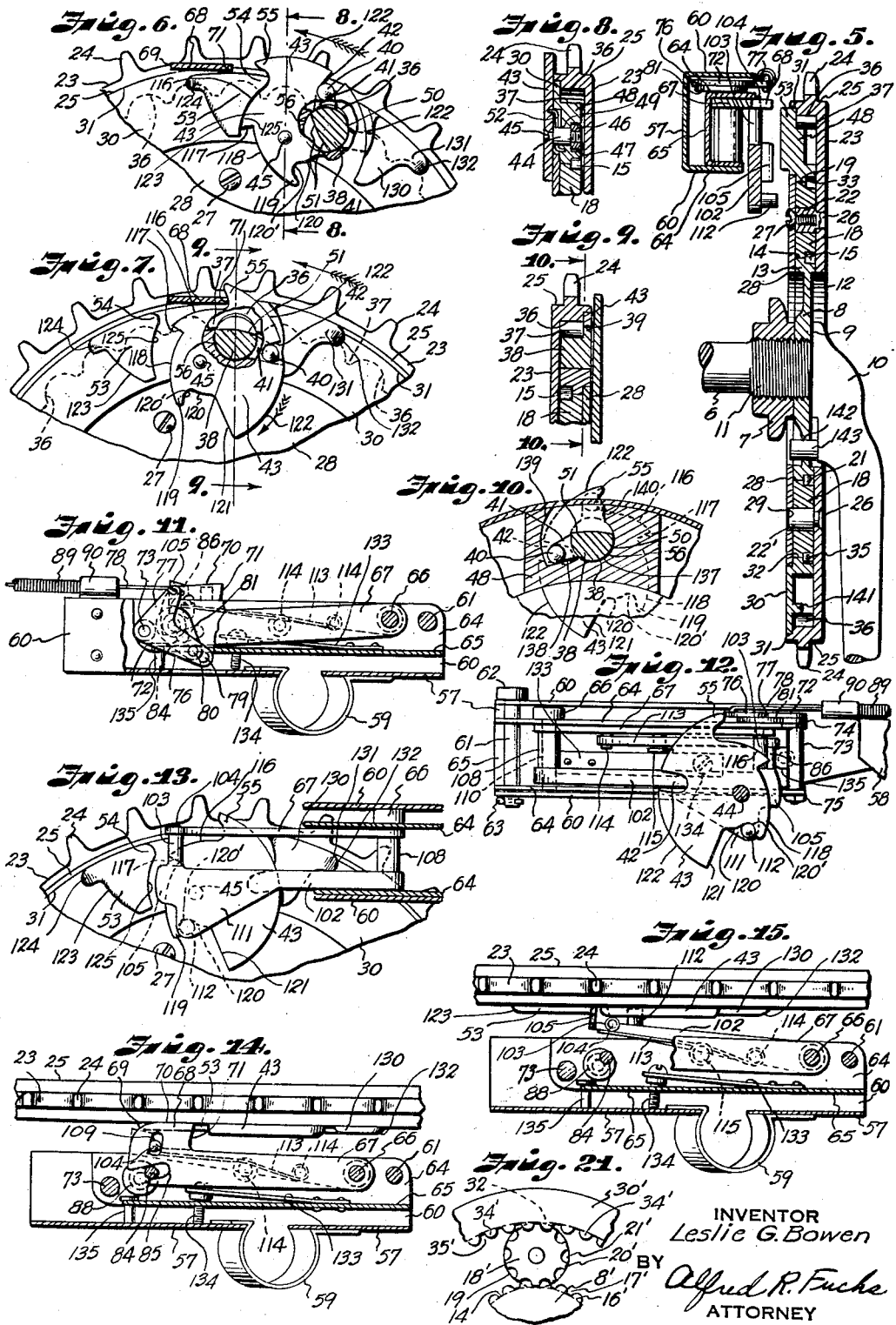

Patented Oct. 17, 1939

2,176,054

UNITED STATES PATENT OFFICE 2,176,054

TWO-SPEED SPROCKET

Leslie G. Bowen, Kansas City, Mo.

Application August 12, 1935, Serial No. 35,776

9 Claims. (Cl. 74—291)

My invention relates to sprocket wheels, and more particularly to a two speed sprocket wheel.

It is a purpose of my invention to provide a two speed sprocket wheel for bicycles, or similar apparatus, which, when operating in high gear, operates substantially in the same manner as any ordinary sprocket wheel, and when operating in low gear drives the chain receiving sprocket portion of the wheel at a slower speed than the pedals attached to the sprocket wheel shaft, so as to form a speed reduction device.

It is a further purpose of my invention to provide a sprocket wheel of the above mentioned character, which is simple in construction and extremely compact in arrangement so that said sprocket wheel will not take up any more room than the ordinary sprocket usually provided on the crank shaft of a bicycle.

It is a further purpose of my invention to provide a sprocket wheel of the above mentioned character, which is light in weight so that the weight of the bicycle will not be unnecessarily increased by the use of the two speed sprocket comprising my invention.

It is another purpose of my invention to provide a two speed sprocket of the character set forth which has the rotating parts, whereby the speed reduction is obtained, entirely enclosed so as to prevent the entrance of dirt into the same and permit said rotating parts to be packed in grease and also to prevent any of said parts from being exposed so that the same cannot come in contact with the operator of the bicycle or the clothing of such an operator.

It is still another purpose of my invention to provide a sprocket wheel of the above mentioned character that has no projecting parts thereon extending beyond the side face thereof that is outermost when the sprocket wheel is in position on the bicycle so that there will be no projecting parts to injure the operator of the bicycle, or to damage the clothing of such an operator.

It is a very important purpose of my invention to provide a two speed sprocket in which the normal or high speed is obtained by a direct drive of the sprocket wheel from the crank shaft, and whereby the slower speed, or lower speed, is obtained by mechanism within the sprocket comprising a central driving member fixed to the crank axle, and a ring-like member spaced therefrom to provide an annular way between the same and rotatable members mounted between said central driving member and said ring-like member and contacting both thereof, said rotatable member being rotatably mounted in the gear member having the sprocket teeth thereon, and means for holding said ring-like member in fixed position so that when said central driving member is rotated, said rotatable members will rotate about said central driving member and roll on said ring-like member to cause said sprocket member to rotate in the same direction as said central driving member, but at a slower speed.

It is still a further purpose of my invention to provide means in a device of the above mentioned character for locking said ring-like member to said sprocket toothed member, so as to rotate therewith and lock said rotatable members against rotation so that said rotatable members, said ring-like member and said central driving member will rotate as a unit and the sprocket toothed outer portion of the wheel will rotate at the same speed as the inner central driving member.

It is still another purpose of my invention to provide means under the control of the operator of the bicycle for holding said ring-like member fixed relative to the bicycle frame and for holding said ring-like member in fixed position relative to the sprocket toothed member, said means comprising apparatus that is mounted on the bicycle frame and apparatus associated with the sprocket wheel and said apparatus associated with the sprocket wheel being substantially entirely confined within said sprocket wheel, and all said mechanism outside the sprocket wheel itself being located on the side of the sprocket toward the bicycle frame whereby there will be no projecting parts that might contact with the clothing of the rider of the bicycle.

It is a further purpose of my invention to provide means for preventing rearward rotation of said ring-like member when it is desired to apply the brake to the bicycle through the usual coaster brake mechanism, so that said means for providing a two speed drive for the sprocket wheel will not prevent transmission of rearward rotation of the pedals to the sprocket portion when the driving mechanism is operating in slow speed.

It is also a purpose of my invention to prevent actuation of the means for fixing said ring-like member to the frame when said pedals are being given a rearward rotation while said apparatus is in direct drive.

Other objects and advantages of my invention will appear as the description of the drawings proceeds. I desire to have it understood, however, that I do not intend to limit myself to the particular details shown or described, except as defined in the claims.

In the drawings:

Fig. 1 is a view in side elevation of a bicycle, showing my improved two speed sprocket mechanism applied thereto.

Fig. 2 is a top plan view partly broken away, of portions of said mechanism.

Fig. 3 is a fragmentary side elevational view of my improved two speed sprocket mechanism, showing the same adjusted for direct drive or high speed operation of the sprocket.

Fig. 4 is a side elevation of my improved sprocket wheel with a portion of the ring-like member and side cover plate removed, showing the means for locking the ring-like member to the sprocket toothed member, in the position assumed thereby when direct drive of the outer sprocket portion from the inner driving portion is taking place.

Fig. 5 is a vertical sectional view through my improved two speed mechanism, taken substantially on a plane corresponding to the line 5—5 of Fig. 3.

Fig. 6 is a fragmentary view partly in section and partly in elevation, showing my improved two speed driving mechanism in the position that the member for operating the locking means assumes just prior to changing from high speed to low speed operation of the sprocket member.

Fig. 7 is a view similar to Fig. 6, but showing the lock operating member partially rotated to the position where the member for locking the ring to the sprocket toothed member is substantially out of engagement therewith.

Fig. 8 is a fragmentary sectional view, taken substantially on the line 8—8 of Fig. 6.

Fig. 9 is a similar view taken substantially on the line 9—9 of Fig. 7.

Fig. 10 is a fragmentary view partly in section and partly in elevation of the lock operating member and associated parts, taken on the line 10—10 of Fig. 9.

Fig. 11 is a fragmentary top plan view of the operating mechanism carried by the frame for controlling the two speed sprocket mechanism with the outer cover member partly broken away.

Fig. 12 is a side elevational view of said operating mechanism on the frame, showing the rotatable member on the two speed sprocket associated therewith, the view being taken from the side of said operating means facing the sprocket, the same being taken on a plane extending between said rotatable member and the outer face of the ring, and showing the pivot member for said rotatable controlling member in section.

Fig. 13 is a fragmentary view partly in side elevation and partly in section, of the sprocket wheel and the operating means for shifting from one speed to another in substantially the same position as shown in Fig. 12.

Fig. 14 is a fragmentary top plan view of the sprocket and the operating means for shifting from one speed to another, showing the same projected, said operating means being partly in section.

Fig. 15 is a view similar to Fig. 14, but with the operating lever partly broken away to show the means for locking the ring-like member to the frame.

Fig. 16 is a view similar to Fig. 14, showing the position of the parts upon reverse rotation of the sprocket wheel.

Fig. 17 is a fragmentary plan view on an enlarged scale of the operating lever and the actuating means therefor.

Fig. 18 is a section taken on the line 18—18 of Fig. 17.

Fig. 19 is a view in elevation of the locking lever.

Fig. 20 is a section thereof taken on the line 20—20 of Fig. 19, and

Fig. 21 is a fragmentary side elevational view of the driving mechanism in a modified form of the device.

Referring in detail to the drawings, my improved two speed drive mechanism is shown as being applied to a bicycle 1 having the handle bars 2, and having a frame comprising the tubular members 3 and 4 which are provided with a bearing 5 for a crank shaft 6 which has a nut 7 screwed thereon for clamping the central portion 8 of a sprocket wheel to a shoulder 9 on a crank 10 which is integral with the shaft 6. The member 8 is, preferably, threaded on a threaded portion 11 of the crank shaft 6 and the nut 7 serves merely to lock it thereon against rotation, this being the usual manner of securing a sprocket wheel to a crank shaft in present day bicycle construction.

The central portion 8 of the sprocket wheel constitutes a central driving member for driving the sprocket either at the same speed at which said driving member rotates or at a slower speed. Said driving member has a web portion 12 and an enlarged rim portion 13. The rim portion 13 is provided with a cylindrical, or smooth, peripheral face portion 14, and a toothed faced portion, or peripheral portion, 15 adjacent the smooth or cylindrical portion 14. The toothed portion 15 is provided with projections, or teeth, 16 alternating with recesses 17, the recesses 17 being depressed inwardly or below the surface of the cylindrical portion 14 and the projections, or teeth, 16 extending outwardly beyond the cylindrical surface 14.

Cooperating with said peripheral surface of the central driving member 8 are a plurality of roller members 18, each of said roller members having a smooth cylindrical face 19 which engages with the smooth cylindrical surface 14 of the member 8 in a similar manner to a roller bearing, and with projections 20 which alternate with recesses 21 to form a toothed peripheral portion adjacent the smooth portion 19, the projections 20 entering the recesses 17 and the projections 16 entering the recesses 21 so that a positive drive is provided between said central driving member 8 and the roller members 18. The teeth, or projections, 20 project outwardly beyond the surface 19 and the recesses 21 project inwardly beyond the surface 19 of each of the rollers 18 in a similar manner to that of the projections and recesses on the central member 8. The roller members 18 are rotatably mounted on shafts 22 and 22', which are provided on the sprocket toothed member 23, which has an outer peripheral portion provided with sprocket teeth 24 and a shoulder portion 25 adapted to receive the sprocket chain links thereon. The member 23 is in the form of a ring-like flanged plate, or disk, with a central opening therein and the stub shafts 22 are fixed in position on said member 23 in any suitable manner, as by headed means 26.

In the form of the invention shown, there are ten rollers 18 provided and these are arranged in close proximity to each other so that the same will properly center the sprocket toothed member on the member 8 and divide the forces exerted in the use of the device uniformly so as to prevent any undue wear of parts or any possibility of breakage of any parts. Certain of the stub shaft members, such as the members 22', which alternate with the members 22, are somewhat shorter than the members 22 and are not provided with any threaded openings therein, such as is provided in each of the members 22 for receiving the screw threaded headed member 27. The members 22' are otherwise the same as the members 22 and serve as bearing members for the rollers 18 in the same manner as the members 22. The members 22' serve to space the cover plate 28 from the rollers so as to prevent frictional engagement between the cover plate and the side faces of the rollers 18, and also prevent rotation of the cover plate relative to the member 23. The screw threaded headed members 27 serve to secure the cover plate in place, but substantially no forces are exerted thereon due to the rotation of the parts because of the provision of the members 22', which take substantially the entire stress that might be applied thereto due to any tendency of the plate 28 to turn relative to the member 23, as these extend into sockets 29 in said plate.

The rollers 18 also engage certain portions of a ring-like member 30 which is mounted for rotation under certain conditions within the member 23, the member 23 being shouldered at 31 to provide a bearing for the member 30 so that it can rotate within the member 23. Said ring-like member 30 is provided with an inner peripheral surface that has a toothed portion and a smooth cylindrical portion, the smooth cylindrical portion 32 being engaged by the smooth cylindrical surface 19 on the rollers 18 and the toothed portion 33 having the teeth 34 thereon alternating with the recesses 35, said teeth 34 projecting inwardly beyond the surface 32 and the recesses 35 being depressed beyond the surface 32 so that the alternating projections 34 and recesses 35 will cooperate with the projections, or teeth, 20 and the recesses 21 on the rollers 18 so as to provide a positive driving connection between the ring-like member 30 and said rollers 18. It will be understood, of course, that the rollers 18 have rolling engagement with the ring-like member through the smooth surfaced portions 32 and 19, which are in engagement with each other at all times and that the inter-engaging toothed portions are provided merely to prevent slippage of the rollers and the ring relative to each other. The ring-like member 30, as previously stated, may be either fixed to the sprocket toothed portion 25 or may rotate therein, dependent upon the adjustment of the apparatus. A tooth 34 is omitted at X and a tooth 16 is omitted at X' to provide for the assembly of the members 18 in interlocking relation with the members 8 and 30.

Suitable means is provided for either locking the members 23 and 30 together to rotate as a unit or to release the member 30 from the member 23. To accomplish this purpose the member 23 is provided with a series of substantially semi-cylindrical recesses 36 on the inner periphery of the rim portion thereof, the same being slightly less than semi-cylindrical, and there being projections 37 between the same which have the inner extremities thereof lying substantially on the circle that forms the inner limit of the inner periphery of the rim portion of the member 23. The ring has a circular outer periphery that runs on the shoulder 31, the recesses 36 being located inwardly toward the disk-like side wall of the member 23 from the shoulder 31. Means is provided cooperating with the recesses 36 to lock the ring-like member 30 to the member 23 when this is desired, said means comprising a rotatable locking dog 38 which is provided with a circular bearing portion 39 that rotates in a circular opening in the ring-like member 30, and which is provided with a lug 40 thereon, which is provided on an arm 41 extending from the circular portion 39 into a slot 42 in a rotatable operating member 43, said member 43 being mounted for rotation on a pivot pin 44 which has a reduced head 45 thereon for fastening the same to the member 43, and which has a reduced threaded end, which has a nut 46 thereon mounted in a recess 47 in a thickened portion 48 provided in the ring-like member 30, an opening being provided at 49 in the member 30 in which the main body portion of the member 44 rotates. The thickened portion 48 is of such external diameter as not to interfere with the rotation of the member 30 within the member 23 and the rotatable operating member 43 projects outward laterally beyond the member 30 on the inner face of the sprocket wheel which faces the frame of the bicycle. The member 43 not only serves to rotate the dog 38, but also serves another purpose, which will be described below.

The dog 38 has a curved surface 50 and substantially flat surfaces 51, which are cut away to permit the release of the ring 30 from the member 23. The curvature of the portion 50 is on a slightly greater radius of curvature than the curvature of the socket portions, or recesses, 36 so that said locking dog 38 will not wedge in the recesses so that free turning thereof under the influence of the operating member 43 is not prevented. In Fig. 6 the locking dog is shown in locking position and in Fig. 7 it is shown in unlocking position. In order to accomplish this unlocking, the member 43 has to be rotated to move the slot 42 thereon from the position shown in Fig. 6 to that shown in Fig. 7, which is only a small portion of a complete rotation of the member 43. Means is provided for normally holding the operating member 43 in such a position that the locking dog 38 is in locking position, or in such position as to hold the ring-like member 30 fixed relative to the member 25, said means preferably comprising a spring 52, which has one end thereof secured in any desired manner to the rotatable operating member 43 and the other end thereof mounted in the member 30 in such a manner that the spring is distorted in a direction tending to rotate the member 38 in a counter-clockwise direction, as viewed in Fig. 6. Means is provided for limiting the rotation of the member 43 in such counter-clockwise direction, said means comprising an abutment 53 provided on the outer face of the member 30, which has a curved toe portion 54 thereon with which a curved hook-like portion 55 on the member 43 engages. The member 53 is formed by merely providing a thickened portion on the ring-like member 30, as will be obvious from Fig. 5. In Fig. 6 the member 55 is shown not quite in engagement with the member 54, while in Fig. 3 it is shown in such engagement. The member 53 also serves other purposes which will be described below.

The member 38 projects laterally from the member 30 toward the member 23, as will be evident from Fig. 9. The member 38 is not absolutely flat on the face thereof opposite the curved face 50, but inclines slightly from the middle of this face toward the curved face so as to lie within the outline of the thickened portion 48 in spaced relation to the projections 37, being seated in a socket 56 in the thickened portion 48 when in the position shown in Fig. 7 and being slightly more than semi-cylindrical so that it will lock within one of the recesses 36 and at the same time have the opposite wall portions thereof adjacent the cut away portion in engagement with the opposite walls of the socket 56. While the normal tendency of the member 38 is to be in locking position, as shown in Fig. 6, means is provided under the control of the operator of the bicycle for rotating the member 43 to move the dog 38 to unlocking position to release the ring 30 from the member 23, and means is also provided for holding said dog in such unlocking position. Said means is mounted on the bicycle frame.

The means for rotating the operating member 43 to unlocking position and for holding it in such unlocking position comprises a trough-like housing member 57, which is provided with bracket members 58 and 59 for securing the same to a bicycle frame, shown as being secured to the frame members 3 and 4. The trough-like member 57 has a pair of side flanges 60 between which extends a pivot pin 61 having a head 62 at one end thereof and being provided with a cotter pin 63 on the other end thereof for holding the same in position. Pivotally mounted on the member 61 are the side members 64 of an inner trough-like frame, which has a transverse wall 65, which is provided with a headed pivot member 66 extending between the side walls 64 upon which a lever 67 is pivotally mounted. The lever 67 has a hook-like end portion 68 thereon, which is similar to a latch member in shape, having a curved wall portion 69 leading to an inclined wall portion 70 which extends to the shoulder 71 provided on the hook-like member 68.

The member 67 is normally held in a retracted position, but when projected the portion 68 thereof with the shoulder 71 thereon will be in the path of the rotatable member 43, as shown in Figs. 6 and 7. When the sprocket wheel is rotated in a forward direction, which is indicated by the arrow in Figs. 6 and 7, the shoulder 71 on the member 68 will engage with the tooth, or projection, 55 on the member 43. The member 68 being stationary, this rotation will cause the rotatable operating member 43 to be rotated in the direction of the arrow in Fig. 7 carrying the dog 38 from the position shown in Fig. 6 to that shown in Fig. 7. When the member 68 is in normal unprojected position, however, it will not engage with the member 55, but will be laterally spaced therefrom. It will be noted that the member 68 is in such position that it will miss the member 53 as the sprocket wheel rotates, but will engage the portion of the projection 55 on the member 43 that projects beyond the member 53 during the rotation of the sprocket wheel. The relative position of the parts 53 and 55 is shown in dotted lines in Fig. 3, and in full lines in Fig. 6, showing also the hook-like member 68. In Fig. 2 the hook-like end portion 68 of the member 67 is shown in projected position in dotted lines and in normal retracted position in full lines.

The means for projecting the hook-like end portion 68 of the lever 67 laterally toward the sprocket wheel comprises a bell crank lever 72 (see Fig. 17 and Fig. 11), which is mounted on a pivot at 73, said pivot member 73 extending between the two side flanges 64 of the inner trough-like member and being provided with an enlargement 74 thereon on the outer side of one of the members 64 for spacing the bell crank lever 72 from said member 64, said bell crank lever being pivotally secured to the member 73 and the member 73 being clamped to the trough-like member by means of the head 74 thereon and a nut 75 which engages a reduced threaded end portion 73' on said member 73. The bell crank lever 72 is provided with an arm 76 and an arm 77. The arm 77 has an operating rod 78 secured in an opening in said arm 77, while the arm 76 has a slot 79 therein running lengthwise thereof. A pull on the operating wire or rod 78 will swing the bell crank lever 72 in a counterclockwise direction in Fig. 17.

A pin 80 is provided which operates in the slot 79, said pin 80 being provided on a crank 81 which has a circular projection 82 thereon that is mounted for rotation in a circular opening 83 in one of the side walls, or flanges, 64 of the inner trough-like member. The crank 81 also has a pin, or lug, 84 projecting therefrom inwardly into the space between the two side flanges 64, said lug, or pin, 84 being mounted in a slot 85 provided in the lever 67 and extending at an oblique angle to the length thereof so that as the pin, or lug, 84 moves along the slot 85 toward its closed end the lever will be swung on its pivot to move the hook-like portion 68 outwardly laterally toward the sprocket wheel. In order to provide a good bearing for the parts and to assure proper cooperation between the various parts of the device and guide the lever 67 in its movements, the lug, or projection, 84 is utilized to connect the round bearing portion 83 with the shaft portion 86 which has a reduced end portion 87 rotating in an opening in the other member 64 of the inner trough-like structure, and is provided with an enlargement or flange 88 thereon located in spaced relation to the side flange 64 so that the lever 67 will be positioned between said flange, or enlargement, 88 and the flange 64 to assure its being held in cooperative relation to the lug, or projection, 84.

The operating rod, or wire, 78 extends from the arm 77 of the bell crank lever 72 through a flexible tubing 89, which is secured at one end in a bracket 90 provided on one of the side flanges 60 of the trough-like member 57, said flexible tubing being secured to the frame 3 by suitable brackets 91 and to one of the handle bars by means of the bracket 92. A bracket 93 is secured to the flexible tubing 89 by any suitable means, such as the bushing 94 and the lock nut 95, the flexible member 78 extending into the bracket and said bracket being provided with pivot ears 96 having a pivot pin 97 thereon for pivotally mounting an actuating lever 98 which has a finger piece 99 thereon for actuating the same, (see Fig. 2). When the actuating lever 98 is pulled toward the rider of the bicycle or to the dotted line position shown in Fig. 2, the hook-like end portion 68 of the lever 67 is projected toward the rotatable operating member 43. The bracket member 93 is, of course, provided with a suitable slot through which the actuating lever 98 extends and said flexible rod-like member, or wire, 78 is secured at 100 to said lever between the pivot and the end thereof having the finger piece thereon. The bracket 93 may be provided at any suitable location on the handle bars, being, preferably, secured adjacent the hand grip by means of the sleeve-like member 101 extending around the bracket adjacent one end thereof.

The apparatus described above will move the operating member to the position shown in Fig. 7, whereupon the ring-like member 30 will be released from the sprocket toothed member 25. However, in order that the apparatus will function properly to accomplish the two speed drive that is desired, it is necessary that the ring-like member 30 be locked in a stationary position. The ring-like member is rotatable relative to the sprocket toothed member when released, but what actually happens is that the ring-like member is fixed and the sprocket toothed member is free to rotate around or upon the ring-like member 30.

Means is provided for holding the ring-like member in a stationary position so that it will not rotate either in the same direction as the sprocket wheel or in the reverse direction, said means comprising a locking lever 102 for said ring-like member 30 shown in Fig. 19, detached. Said locking lever has a post 103 thereon that terminates in a small lug 104 and has a curved inclined rib 105 thereon which is transversely beveled, as indicated at 106. A hollow tubular portion, or sleeve, 108 is provided on the opposite end of the member 102 and a bore 107 extends through said lever and said sleeve-like portion 108. The lever 67 is provided with a slot 109 and the reduced portion 104 on the post-like member 103 extends through said slot 109. The lever 102 is mounted on the same pivot as the lever 67, the shaft 110 of the pivot member 66 having the sleeve-like member 108 of said lever 102 mounted thereon. The shoulder between the post-like member 103 and the reduced end portion 104 thereon spaces the levers 67 and 102 from each other so that these will always be in parallel relationship.

The lever 102 is provided with an ear 111 which extends in the opposite direction to the post-like member 103 and the sleeve-like member 108. Said ear 111 is provided with a lug, or pin, 112 projecting substantially at right angles to the members 108 and 103. Resilient means is provided tending to move the lever 102 outwardly relative to the lever 67 and the lug, or projection, 104 toward the outer end of the slot 109, that is, that end nearest to the inclined edge 70 of the hook-like portion 68 of the lever 67, said means comprising a spring 113, one end of which is mounted back of the post-like member 103 and the other end of which is wound around a lug 114 extending from the lever 67, the intermediate portion of said spring 113 being mounted under the head of a headed member 115 provided on the lever 67. The tendency of the spring 113 will thus be to urge the lug, or projection, 104 toward the end of the slot 109 in which it is shown in Fig. 16, but permitting the lever to yield away from the sprocket wheel under certain conditions when this is desired.

As the portion 68 of the member 67 engages with the projection 55 on the operating member 43 during rotation of the sprocket in a forward direction it begins the rotation of said operating member. The operating member has a curved edge 116 which terminates in a shoulder 117 from which another curved edge 118 extends to a hook-like projection 119 which is adjacent a recess 120 in the edge of the member 43, said member 43 having a substantially radially extending edge portion 121 extending from the recess 120 to the outer curved surface 122 of said member 43, which extends from the radial edge 121 to the hook-like portion 55. As the member 43 is rotated the curved edge portion 118 moves opposite the curved rib 105 on the lever 102 which has been carried toward the sprocket member along with the lever 67 when the same was projected, said rib portion 105 riding along the face of the abutment 53 as said sprocket rotates and holding the lug, or projection, 112 from contact with the member 43, the abutment 53 being beveled along the curved edge 123 and at the projection 124 thereon so that the rib 105 will ride up onto the abutment 53, this being permitted due to the yielding mounting of the lever 102 on the lever 67. When the member 43 has rotated far enough that the lug 112 can pass in back of the hook-like member 119 into the recess 120, the rib 105 will drop off the abutment 53, back of the shoulder 117 and the lug 112 will drop into position behind the hook-like member 119, said rib 105 then fitting between the curved face 125 on the abutment 53 and the curved face 118 on the member 43 to interlock the lever 102 with the ring 30 between the member 43 and the member 53. If the sprocket has turned so far that the rib 105 is engaging the outer face of the operating member 43 at this time the beveled face 106 thereof will cause the member 105 to slide down into position in the groove provided between the curved faces 118 and 125 causing the pin, or lug, 112 to engage in the recess 120, said recess having a seat 120' for said lug 112.

The ring 30 will be held against rotation in either direction in this manner until the finger 99 is moved forward to move the lever 67 and with it the lever 102 from engagement with the abutment 53 and the rotatable member 43. As soon as such release takes place the spring 52 will restore the rotatable member 43 to its position with the hook-like member 55 in engagement with the curved corner 54 of the abutment 53, and the locking dog 38 will be rotated to a position similar to that in Fig. 6 when it will be seated in a recess 36 locking the ring to the outer sprocket member to rotate therewith as a unit, the locking dog entering any one of the recesses 36 that may be opposite the same as this action takes place. While the ring-like member 30 is locked in stationary position, the two-speed driving mechanism is in slow speed adjustment. As the inner member 8 rotates in a counter-clockwise direction, as viewed in Fig. 4, the members 18 will rotate in a clockwise direction and roll on the stationary ring-like member 30 in a counterclockwise direction. However, due to the combined motion of the member 8 and the members 18, the sprocket toothed member 23, which will be carried around with the members 18 as they travel around on the ring-like member 30, will be moved at a slower rate of speed than the central member 8, the actual speed reduction depending on the size of the members 8 and 18 and of the inner periphery of the member 30, but in the particular embodiment shown, the member having the sprocket teeth thereon will rotate at one-third of the speed of the member 8.

Means is provided for preventing the operation of the means for locking the ring-like member to the frame so that it is stationary and the means for throwing the locking dog 38 out of locking position when the crank shaft is rotated in a reverse direction, as, when the brake is to be applied. Said means comprises an abutment 130 which is mounted on the ring-like member 30, and which has a projection 131 which has a beveled face 132 serving as a cam to move the end 68 of the member 67 and with it the member 102 away from the sprocket, should it accidentally be operated to be projected at the same time that the brakes are being applied.

Upon reference to Fig. 15 it will be seen that the member 43, the member 130 and the member 53 have the outer faces thereof substantially in the same plane. As the sprocket is rotated in a backward direction the member 68 will be engaged on the curved edge 69 thereof by the beveled, or cam, face 132 and will ride over the member 43. It will be noted that the abutment 130 extends out radially further than the abutment 53, the member 68 passing the abutment 53 but engaging with the abutment 130 during reverse rotation of the sprocket relative to said member 68. The member 68 is mounted so that it will yield when engaged by the abutment 130 due to the provision of the inner channeled, or trough-like, member having the bottom 65. The bottom 65 of said member has a spring 133 riveted thereto at one end, said spring having a headed member 134 secured to the free end thereof, said headed member extending through an opening in the bottom 65 and engaging the bottom 57 of the outer trough-like member.

The bottom 65 of the inner trough-like member has a slot in the end thereof remote from that at which it is pivotally mounted on the outer trough-like member by means of the pivot 61 through which the headed member 135 extends acting as a stop to limit outward movement of the inner trough-like member relative to the outer trough-like member, said inner trough-like member being limited in its movement so that it will not project the member 68 outwardly into the path of the member 43 unless the finger piece 99 is pulled back by the rider of the bicycle for projecting the same. In Fig. 15 the inner trough-like member is shown with its bottom 65 moved outwardly to the limit, or in its normal position relative to the sprocket wheel. In Fig. 16 the member 68 is shown as having been engaged by the abutment 130 and as having been moved away from the sprocket member thereby, the entire inner trough-like member swinging slightly on its pivot to accomplish this, such swinging being permitted by the yielding mounting thereof by means of the resilient member 133.

The socket 56 in which the locking dog 38 is mounted has a curved wall 137 which substantially fits the curved surface of the locking dog 38, but is of a slightly smaller radius of curvature so as to prevent any binding of the locking dog in said portion 137 of the socket. Said socket is also provided with a straight wall portion 138 and a curved wall portion 139 so as to accommodate the arm 41 and the lug, or projection, 40 in the swinging movements thereof. The curved wall portion 139 of the recess 56 extends to the outer edge of the ring 30 and a straight edged portion 140 extends from the curved portion 137 to the outer edge of the ring 30. The ring 30 is also provided with an inwardly extending rib 141 which engages the inner edges of the projections 37 on the member 25 so as to permit rotation of the ring 30 relative to the member 25 when this is desired. The inner or central member 8 is provided with an opening 142 which receives a lug 143 on the crank member 10 so as to lock the crank member and the crank shaft against rotation relative to the member 8.

Instead of providing the members 8, 18 and 30 with projections, such as shown in Fig. 4, the member 8' corresponding to the member 8, the member 18' corresponding to the member 18 and the member 30' corresponding to the member 30 shown in Fig. 21 may be utilized in which the member 18' is provided with projections 20' which alternate with the recesses 21', the recesses 21' being made substantially in the same manner as previously described, but the projections 20' extending only to the roller surface 19 and not beyond the same. The projections 16' on the members 8' alternate with recesses 17', which recesses 17' are, however, not depressed below the curved cylindrical surface 14 of the member 8'. The ring-like member 30' is provided with projections 34' which are similar in shape to the projections 16' alternating with recesses 35' which receive the projections 20', the bottoms of which are on the same circle as the cylindrical inner periphery 32 of said member 30'. Thus an inner rotatable member 8' is provided that has projections thereon at the periphery thereof and a cylindrically surfaced portion and the ring-like member 30' has a periphery that has a cylindrically surfaced portion and a portion provided with projections, these cooperating with the rollers 18' having a peripheral portion that is also cylindrical, and a peripheral portion that is provided with alternating projections and recesses. The operation of the members 8', 18' and 30' is exactly as that of the members 8, 18 and 30 and these are similarly mounted and similarly arranged in the sprocket wheel.

What I claim is:

1. In a sprocket wheel, a sprocket toothed portion, a member mounted to rotate with a crank axle and means for rotating said toothed portion either at the same rate as said member on the crank axle or at a slower rate than said member comprising a ring-like member adapted to rotate within said toothed portion or to be fixed thereto, and a rotatable dog for locking said ring-like member against movement relative to said toothed member.

2. In a sprocket wheel, a sprocket toothed portion, a member mounted to rotate with a crank axle and means for rotating said toothed portion either at the same rate as said member on the crank axle or at a slower rate than said member comprising a ring-like member adapted to rotate within said toothed portion or to be fixed thereto, and a rotatable dog for locking said ring-like member against movement relative to said toothed member, said sprocket portion having an annular series of recesses adapted to receive said dog.

3. The combination with a two speed sprocket having rotatable means thereon for locking the same in either low or high speed adjustment, of actuating means on the frame carrying said sprocket for rotating said rotatable means, and means for projecting said actuating means into the path of said rotatable member upon rotation of said sprocket in one direction, said sprocket being provided with means for rendering said actuating means ineffective upon rotation of said sprocket in the reverse direction.

4. The combination with a two speed sprocket having rotatable means thereon for locking the same in either low or high speed adjustment, of means on the frame carrying said sprocket for locking a portion of said sprocket to said frame to hold the same stationary, said means comprising a member engaging said rotatable means and fixed means on said sprocket to hold said portion of said sprocket from rotation in either direction.

5. The combination with a two speed sprocket having a ring thereon adapted to be either free thereof to permit a portion of said sprocket to rotate thereabout or fixed thereto to rotate therewith, of means on said sprocket and on the frame on which said sprocket is mounted to successively release said ring from said sprocket portion to permit rotation of said sprocket portion relative thereto, lock said ring against rotation in either direction and lock said means on said sprocket from reverse movement to that which takes place to release said ring from said sprocket portion.

6. A variable speed mechanism comprising an outer rotatable member, an inner rotatable member and an annular member having rotatable means thereon mounted between said outer and inner rotatable members and engaging said inner and outer rotatable members, and positive stop means for holding one of said rotatable members against rotation in either direction to drive said annular member from said other rotatable member due to the rolling of said rotatable means about said inner rotatable member, said stop means comprising a member mounted for movement into alternative positions on the member held against movement and projecting only slightly laterally therefrom.

7. Mechanism of the character described comprising a crank shaft, a driving member mounted thereon to rotate therewith, a plurality of members rolling on said driving member, inter-engaging means on said driving member and said rolling members for rotating said rolling members by means of said driving member, a member having sprocket teeth on the periphery thereof, means on said member having said sprocket teeth for rotatably supporting said rolling members thereon, and means for producing a rolling motion of said rolling members on said driving member upon rotation of said driving member, whereby said member having the sprocket teeth thereon rotates in the same direction as said driving member but at a slower speed, comprising stop means for holding one of said members against rotation in either direction, means for actuating said stop means upon rotation of said driving member in one direction and means for preventing operation of said actuating means upon rotation of said driving means in a reverse direction.

8. A variable speed mechanism comprising an outer rotatable member, an inner rotatable member and an annular member having rotatable means thereon mounted between said outer and inner rotatable members and engaging said inner and outer rotatable members, positive stop means for holding one of said rotatable members against rotation in either direction to drive said annular member from said other rotatable member due to the rolling of said rotatable means about said inner rotatable member, and means for releasing said positive stop means and positively locking said rotatable members against relative rotation comprising a stop on one of said rotatable members adapted to engage any one of an annular series of cooperating stop means on another of said rotatable members and means for moving said stop into engaging position, comprising a member projecting only slightly from one side face of the rotatable member having said stop means thereon.

9. In a device of the character described, a central rotatable member, a ring-like rotatable member spaced from said central rotatable member to provide an annular way therebetween, one of said spaced rotatable members being a driving member provided with means for rotating the same in either direction, positive stop means for holding the other of said spaced rotatable members against rotation in either direction during rotation of said driving member in either direction, a peripheral rotatable member, and members rotatably mounted on said peripheral rotatable member in said annular way and engaging said central rotatable member and said ring-like rotatable member to rotate said peripheral member in the same direction as said driving member but at slower speed than said driving member when the other of said spaced rotatable members is held against rotation, said stop means comprising a shiftable member held against rotation with said driving member, and interfitting abutment means on said shiftable member and said other member engaging upon movement of said shiftable member into holding position, said stop means being movable into holding position only during rotation of said driving member in one direction.

LESLIE G. BOWEN.